May 30, 1933.  L. B. HOWARD  1,911,690
BILL AND STUB RECEIPTING AND SEVERING MEANS
Filed May 6, 1929   5 Sheets-Sheet 1
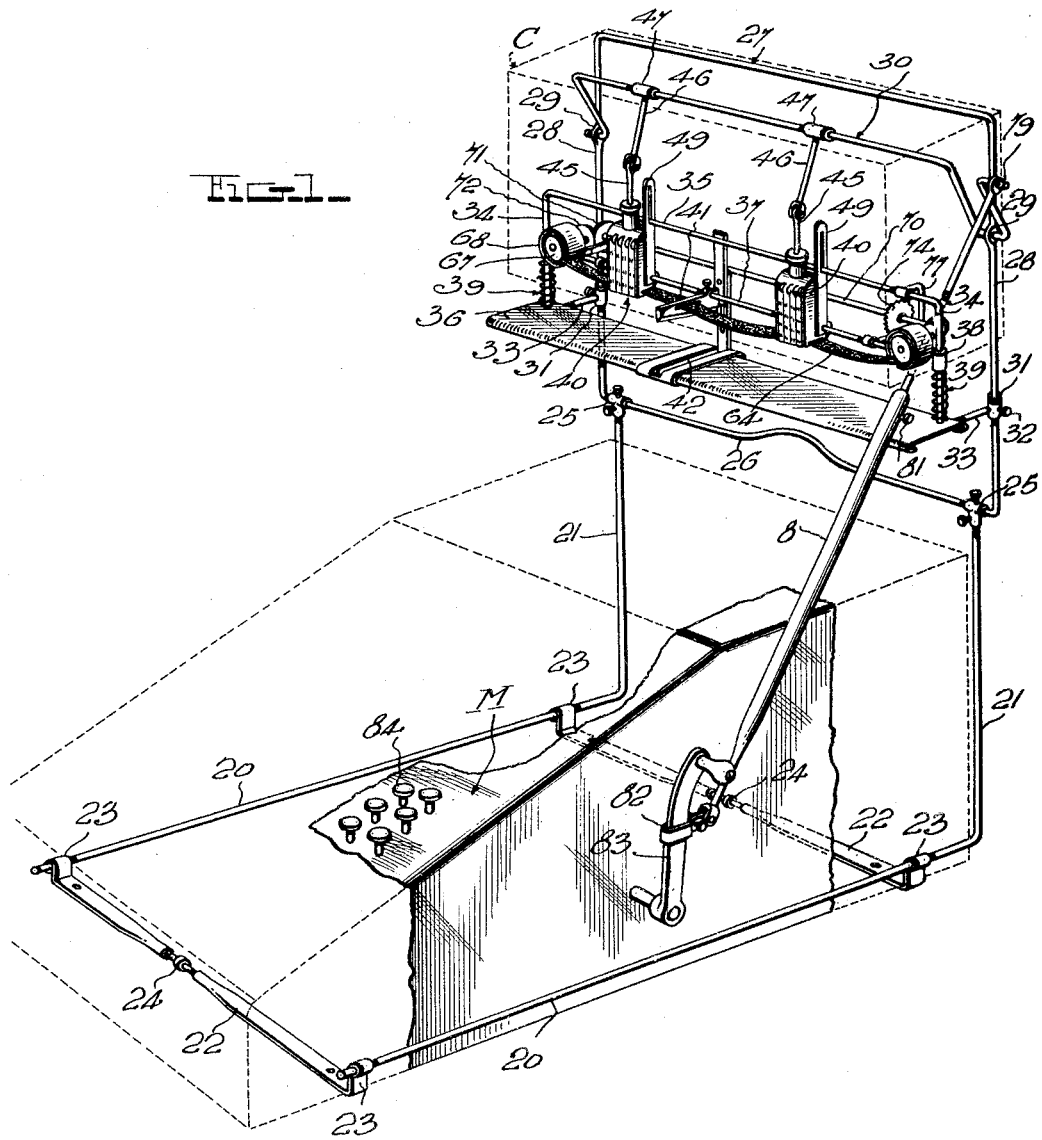

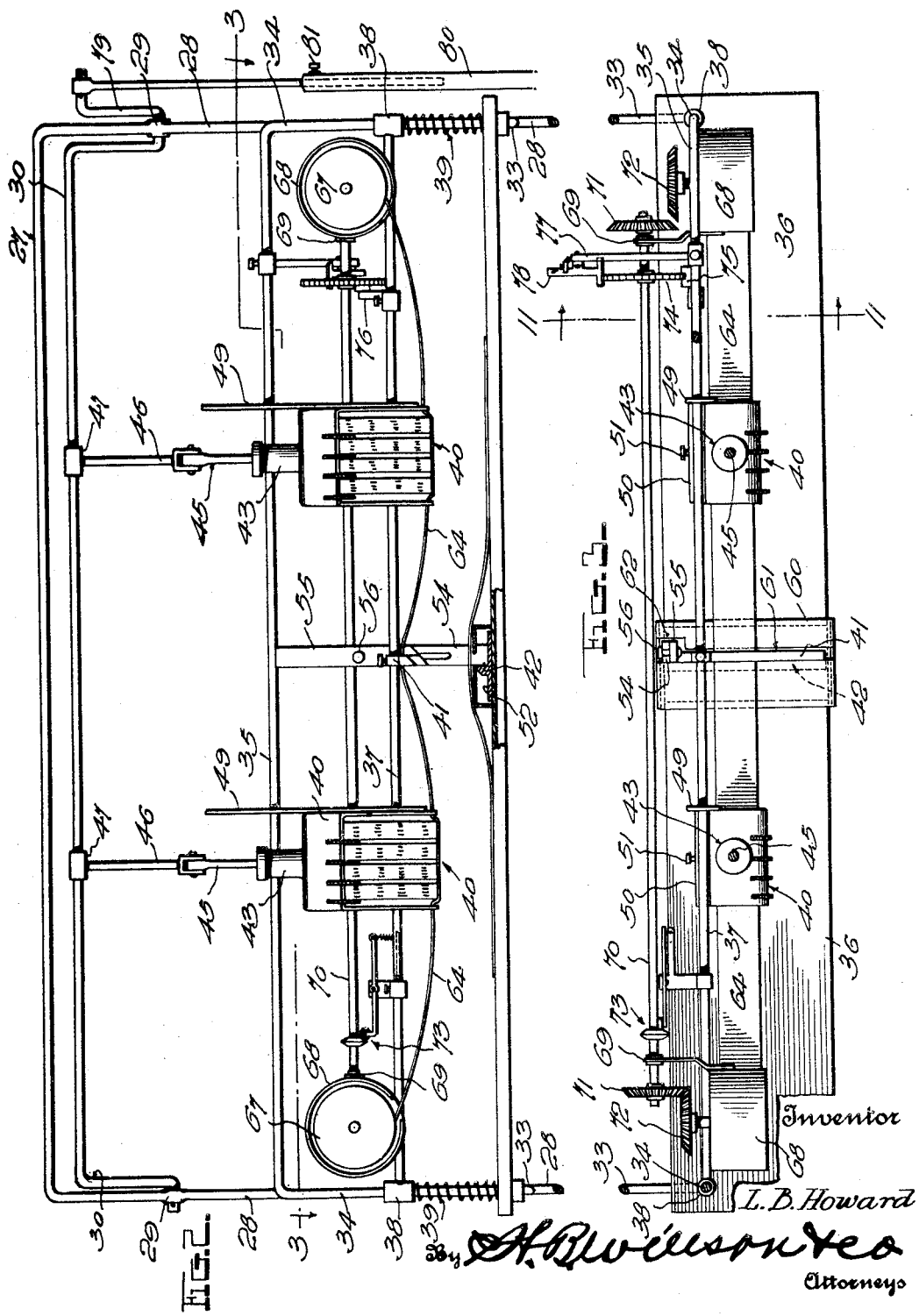

May 30, 1933.  L. B. HOWARD  1,911,690
BILL AND STUB RECEIPTING AND SEVERING MEANS
Filed May 6, 1929   5 Sheets-Sheet 3
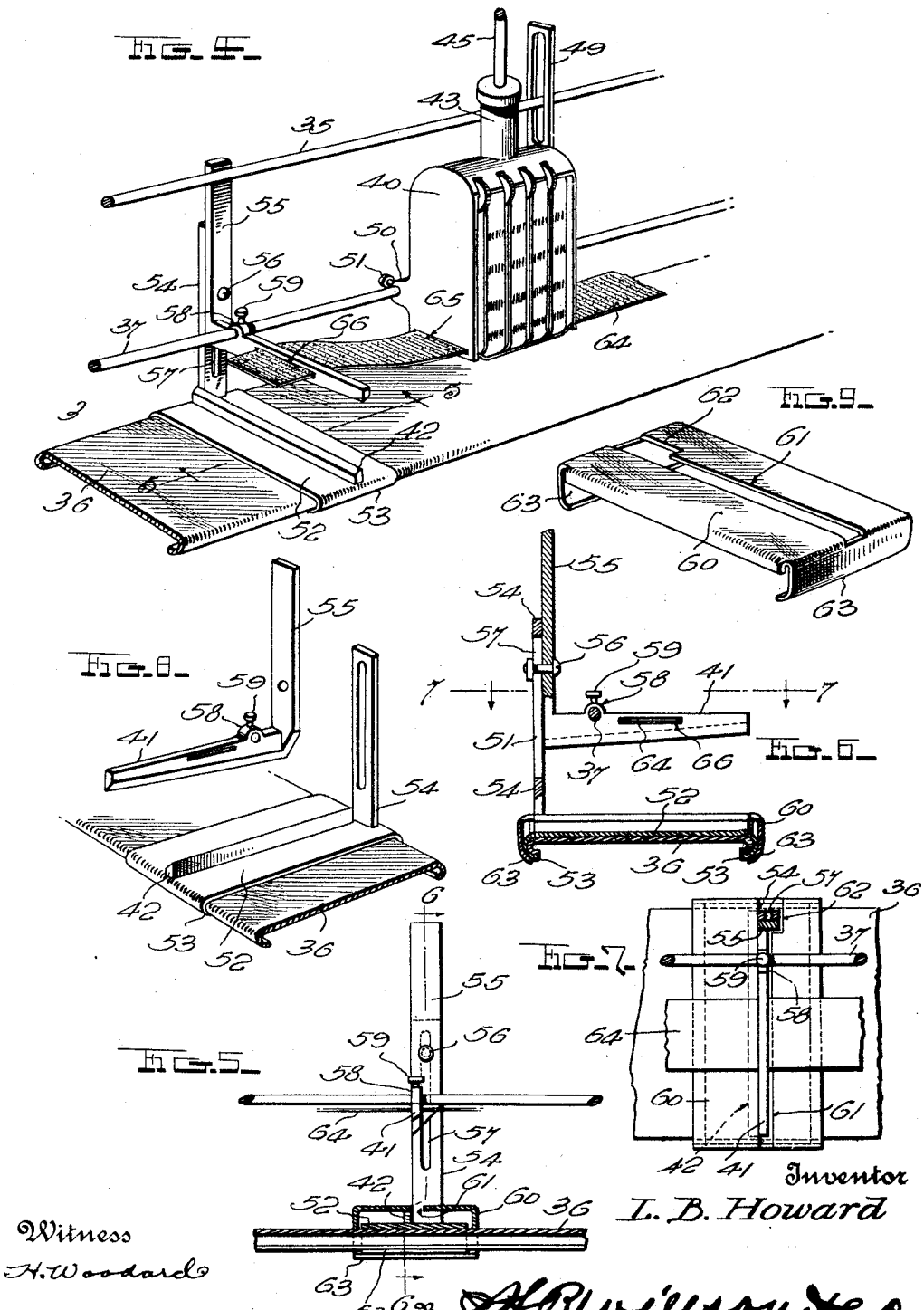

May 30, 1933.  L. B. HOWARD  1,911,690
BILL AND STUB RECEIPTING AND SEVERING MEANS
Filed May 6, 1929  5 Sheets-Sheet 4
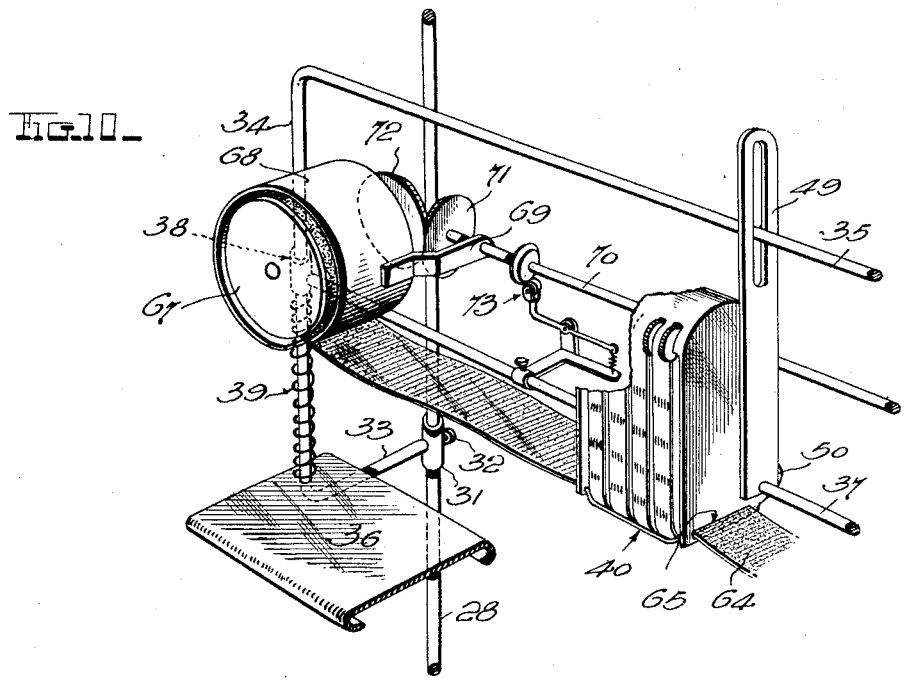
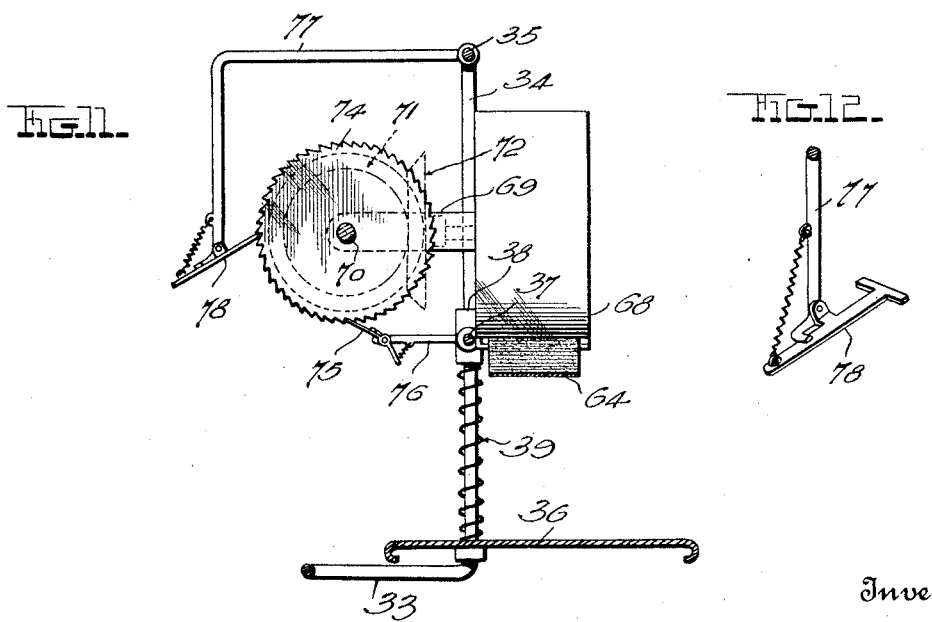 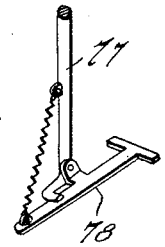
Witnesses
H. Woodard
Inventor
L. B. Howard
By H. B. Willson & Co
Attorneys May 30, 1933.                L. B. HOWARD                1,911,690
              BILL AND STUB RECEIPTING AND SEVERING MEANS
                    Filed May 6, 1929          5 Sheets-Sheet 5
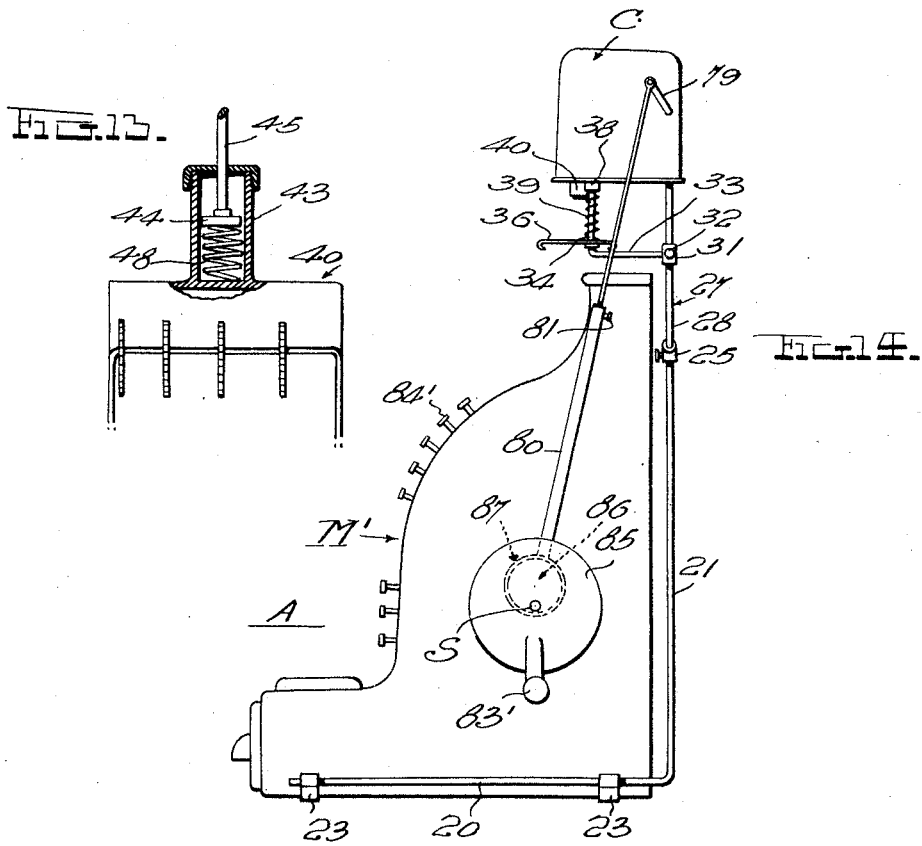
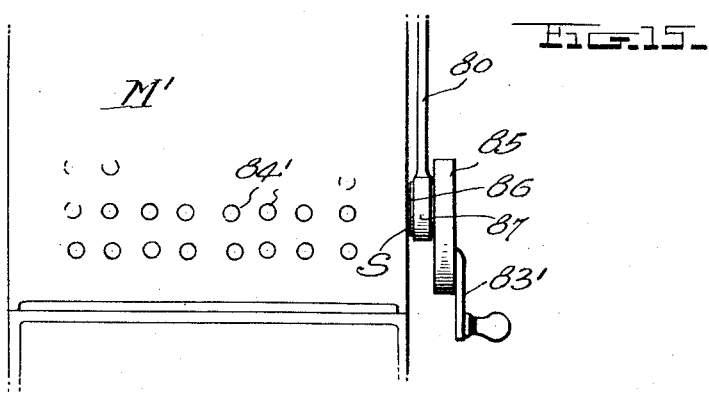
Witnesses
H. Woodard
Inventor
L. B. Howard
By H. B. Wilson Yeo
Attorneys Patented May 30, 1933

1,911,690

UNITED STATES PATENT OFFICE

LUTHER B. HOWARD, OF CHATTANOOGA, TENNESSEE

BILL AND STUB RECEIPTING AND SEVERING MEANS

Application filed May 6, 1929. Serial No. 360,964.

It is common practice for various public utilities companies to submit bills each month with attached stubs, both showing the amount due, and when any bill is paid the receiving clerk receipts both the bill and the stub, tears the two apart and returns one as a receipt, the other being kept for the company's record. Then too, whenever a bill is paid, it is customary for the receiving clerk to register the amount received either by means of a cash register or an adding machine, allowing the numerous receipts to be totaled at each day's close of business. Hence, in connection with each bill paid, the receiving clerk must perform several operations, that is receipt the bill, receipt the stub, tear the two apart and register the amount received, requiring an amount of time which becomes an appreciable factor when handling large numbers of customers.

It is the primary object of my invention to make unique provision whereby the several operations above explained may be concurrently performed when the receipt registering machine (adding machine or cash register) is operated to register the amount received for any bill. According to the present disclosure, the clerk depresses the proper register keys according to the amount of the bill and places said bill and its attached stub upon a support provided for the purpose. He then operates the usual handle of the receipt registering machine and this operation receipts both the bill and stub and cuts them apart. Performing the bill and stub receipting and cutting operations concurrently with registering the amount of the bill, effects a saving in time and energy of appreciable magnitude in any given period and allows the clerk to more easily and rapidly handle the usual rush which occurs near the end of the customary discount period.

While the invention aims primarily at receipting bill and stub and cutting them apart as above explained, it is of course within the scope of said invention to merely provide for the operation of a bill receipter concurrently with operation of the registering machine.

Another aim of the invention is to embody the invention in the form of a novel attachment quickly and easily applicable to conventional adding machines and cash registers.

Yet another aim is to provide cutting and stamping means of novel construction and of advantage even if operated in ways other than hereinbefore mentioned.

With the foregoing in view, the invention resides in the novel subject matter hereinafter described and claimed, description being accomplished by reference to the accompanying drawings.

Fig. 1 is a perspective view showing the attachment upon a conventional adding machine.

Fig. 2 is an enlarged front elevation of the upper portion of the attachment.

Fig. 3 is a horizontal sectional view on line 3—3 of Fig. 2.

Fig. 4 is a perspective view of one of the receipting stamps, the receipt and stub severing knives and associated parts.

Fig. 5 is a detail vertical section as indicated by line 5—5 of Fig. 4.

Fig. 6 is a vertical transverse sectional view on line 6—6 of Fig. 5.

Fig. 7 is a horizontal section on line 7—7 of Fig. 6.

Fig. 8 is a disassembled perspective view of the two knives and associated parts.

Fig. 9 is a perspective view of the stationary knife guard omitted in Figs. 4 and 8.

Fig. 10 is a perspective view of one of the stamps, the ink ribbon for said stamps, a portion of the ribbon-winding or reeling means and associated parts.

Fig. 11 is a vertical transverse sectional view on line 11—11 of Fig. 3 showing more particularly the means for operating the driving shaft of the ribbon reels.

Fig. 12 is a perspective view of the pawl and a portion of its carrying arm (shown in Fig. 11).

Fig. 13 is a detail sectional view partly in elevation showing the preferred connection employed between each stamp and its operating means.

Fig. 14 is a side elevation of the invention applied to a conventional cash register.

Fig. 15 is a detail front elevation as indicated by the arrow A of Fig. 14.

The drawings above briefly described illustrate the preferred general construction of the invention and this construction will therefore be rather specifically described. It is to be understood however that within the scope of the invention as claimed, numerous variations may be made.

With slight variations, the construction used upon a cash register is the same as that used upon an adding machine. Hence, a description of the construction generic to both and an explanation of the variations in connection with the cash register attachment will suffice.

In the drawings above briefly described, 20 denotes two horizontal rods for disposition at opposite sides of the receipt registering machine (adding machine or cash register) with which the attachment is to be used, and 21 denotes a pair of rigid rods rising from the rear ends of said rods 20, the two sets of rods being preferably integral with each other as shown. Longitudinally extensible and contractible transverse bars 22 extend between the rods 20 and are provided with upturned ends 23 secured thereto, appropriate double screws or the like 24 being provided for contracting the bars 22 to clamp their ends and the rods 20 against opposite sides of the machine M. Two alined sleeves 25 are suitably secured to the upper ends of the rods 21, said sleeves receiving the lower rod or bar 26 of a vertically disposed rectangular frame 27, the vertical side rods or bars of this frame being given the number 28 for future reference. Near their upper ends, the bars 28 are provided with horizontally alined bearings 29 in which an appropriate crank shaft 30 is mounted. Below these bearings, two sleeves 31 are adjustably secured upon the bars or rods 28 by means of set screws or the like 32. Forwardly projecting arms 33 are rigidly secured to the sleeves 31, guide posts 34 are secured to and rise from the front ends of the arms 33, and a horizontal guide rod 35 extends between and is secured to the upper ends of said posts, the parts 33–34–35 being preferably integral with each other as shown. A horizontal platen 36 is secured to the arms 33 and the lower ends of the guide posts 34, and above this platen is a horizontal carrier rod 37 whose ends are provided with guides 38 slidable upon the guide posts 34, coiled springs 39 being provided on said posts to normally elevate said carrier rod to the position shown in the drawings. The two receipting stamps 40 and the movable knife 41 are mounted on the carrier rod 37 and provision is made whereby operation of the crank shaft 30 depresses stamps, knife and carrier to cause receipting of both the bill and its stub and cutting of one from the other, said movable knife being co-operable with a stationary knife 42 mounted upon the platen 36.

The upper end of each stamp 40 is provided with a tubular projection 43 receiving a plunger 44 on the lower end of a vertical thrust rod 45, this rod being pivoted to the lower end of a link 46, which link is provided with a bearing 47 through which a crank of the shaft 30 passes. Hence, upon operation of the shaft, the link 46 and rod 45 will move the plunger 44 downwardly, and a cushioning spring 48 is mounted in the projection 43 under said plunger to exert yieldable downward force upon the stamp 40. The two stamps 40 being mounted upon the carrier rod 37, cause depression of this rod when the stamps are depressed by operation of the crank shaft 30, and depression of said rod 37 causes operative movement of the knife 41 so that upon each operation of the shaft 30, the two stamps 40 descend to receipt the bill and its stub and the knife 41 descends to cut said bill and stub apart. To guide the stamps 40 in their vertical movements, they are provided with upstanding slotted guide members 49 slidable upon the guide rod 35.

Provision is made whereby the stamps 40 may be adjusted longitudinally over the platen 36 and whereby the co-acting knives 41–42 may be similarly adjusted. Preferably the rear side of each stamp 40 is provided with a tube 50 (Fig. 4) through which rod 37 passes, said tube being provided with a set screw 51. Loosening of this set screw permits adjustment of the stamp 40 to the desired position and tightening of said screw holds the stamp after adjustment.

The stationary blade 42 is provided with a carrying base 52 which rests upon the platen 36 and has its ends bent downwardly and inwardly to provide hooks 53 which engage the edges of said platen, thereby so attaching the base to the platen as to permit adjustment longitudinally thereof. A post 54 rises rigidly from the inner end of the knife 42, and a second vertical post 55 which carries the movable knife 41, is slidably connected with said post 54 by any desired means, for instance, by a bolt or the like 56 carried by post 55 and received in a slot 57 in post 54. Upon the upper edge of knife 41, I have shown a guide 58 through which the rod 37 passes, said guide being provided with a set screw 59. Upon loosening of this set screw, the entire knife assembly may be shifted longitudinally of the platen 36 and upon tightening of said screw, said assembly is held in its adjusted position.

An appropriate guard plate 60 has been shown for the stationary knife 42, said plate being slotted at 61 to receive the movable knife 41 when it descends. The rear end of slot 61 is widened as at 62 to accommodate the posts 54–55. The ends of plate 60 are curved downwardly and inwardly providing attaching hooks 63 which engage the outer sides of the hooks 53.

An ink ribbon 64 is provided for the stamps 40, the lower ends of the latter being equipped with appropriate guide slots or the like 65 through which said ribbon passes. The movable knife 41 is also preferably provided with a ribbon guide 66. Two reels 67 are provided for the ribbon 64, said reels being suitably mounted in stationary housings 68 which are rigidly mounted upon the carrier rod 37. These housings are provided with rearwardly projecting rigid bearings 69 in which a shaft 70 is rotatably and slidably mounted. The ends of this shaft are provided with bevel gears 71, and driving gears 72 are provided for the two reels 67. When shaft 70 is shifted in one direction, one of its gears 71 moves into mesh with the adjacent gear 72 while the other of said gears 71 moves out of mesh with the previously co-operating gear. Shifting of shaft 70 in the other direction accomplishes the reverse. It will thus be seen that by rotation of shaft 70 either reel 67 may be driven, so that the ribbon 64 may be alternately wound upon said reels. An appropriate yieldable latch 73 is provided to hold shaft 70 in either of its operative positions, and provision is made for turning said shaft a fraction of a revolution each time the machine is operated. This means is shown most clearly in Figs. 11 and 12, to which reference is now made.

Secured upon shaft 70 is a ratchet wheel 74 normally held against turning in one direction by a dog 75 mounted upon an arm 76 which projects rearwardly from the carrier rod 37. An angular arm 77 is secured to the guide rod 35 and is provided with an appropriate pawl 78 co-operable with the ratchet wheel 74. Each time the carrier rod 37 moves downwardly upon operation of the receipter, pawl 78 remains stationary while ratchet wheel 74 moves downwardly, attention being invited to the fact that shaft 70 is mounted in bearings carried by the housings 68 and the latter are secured to said carrier rod 37. The result is that upon each depression of rod 37, pawl 78 turns ratchet wheel 74 a predetermined amount, thus causing one or the other of the gears 71 to drive one or the other of the reels 67, effecting feeding of the ribbon 67 to expose a fresh surface thereof for use. When rod 37 and parts movable therewith again return to their raised position under the influence of the springs 39, dog 75 holds wheel 74 against retrograde movement and pawl 78 clicks idly over the teeth of said wheel.

A suitable casing C shown in dotted lines in Fig. 1 and in full lines in Fig. 14, is provided for normally housing a number of the operating parts, the platen 36 however being spaced below this casing to permit the clerk to quickly and easily place a bill and attached stub upon it. At the exterior of this casing, I have shown an operating crank 79 for the crank shaft 30, and pivoted to this crank 79 is an extensible and retractible rod 80 held in adjusted position by a set screw 81. By appropriate means 82, the lower end of rod 80 is connected with the usual handle 83 of the machine M, which handle is operated in the usual way after depression of the setting keys 84.

Whenever a bill is presented to the receiving clerk and is paid, he places the paid bill and its attached stub upon the platen 36 with the juncture between bill and stub disposed over the stationary knife 42, and before or after or while he is placing the bill upon the platen, he depresses the keys 84 according to the amount of said bill. Then when he pulls the handle 83 after setting of said keys 84, he at the same time effects depression of both stamps 40 and the movable knife 41, causing said stamps to receipt both the bill and the stub and causing said knife to sever said bill and stub from each other. Hence, at one operation, results are obtained which have heretofore required a number of operations and consequently, saving in time and energy is obtained.

It may be briefly explained that each time rod 80 is pulled by operation of handle 83, crank 79 causes turning of the crank shaft 30. This crank shaft forces downwardly upon the rods 46—45 and the springs 48 and causes depression of the stamps 40. As these stamps descend, the rod 37 also descends, said rod carrying the movable knife 41. Upon descent of this rod, the ribbon-feeding means is operated in the manner above described. When handle 83 is returned to normal, the movable parts of the stamping and cutting means similarly return, such return being facilitated by the springs 39 under the guides 38 of the carrier rod 37.

In Figs. 14 and 15, the attachment is shown upon a receipt registering machine in the form of a cash register M′ having the usual setting keys 84′ and operating handle 83′. I have shown this handle provided with a wheel 85 spaced outwardly from one side of the machine and upon the shaft S, I have mounted an eccentric 86 disposed between said side of the machine and said wheel. Around this eccentric is an eccentric strap 87 which is secured to the lower end of the rod 80. By this construction, each operation of handle 83′ after setting the keys 84′, causes operation of the receipting and cutting means as above described.

It will be seen from the foregoing that efficient means have been provided for carrying out the objects of the invention and attention is again invited to the fact that variations may be made within the scope of said invention as claimed.

I claim:—

1. A stamping device comprising a platen, two fixed guide posts at the ends thereof, a guide rod extending between and secured to said posts in vertically spaced relation with said platen, a carrier rod extending longitudinally between said platen and said guide rod and having its ends slidably engaged with said posts, a stamp mounted on said carrier rod for co-action with said platen, said stamp having a guide slidably engaged with said guide rod, and means for moving said carrier rod and stamp to move the stamp toward and from the platen.

2. A stamping device comprising a fixed frame embodying two spaced vertical rods having horizontally alined bearings, two rigid arms projecting forwardly from said rods respectively and disposed below said bearings, two rigid guide posts projecting upwardly from the front ends of said arms respectively, a horizontal guide rod extending between and secured to the upper ends of said posts, a horizontal platen having its ends secured at the lower ends of said posts, a horizontal carrier rod whose ends are slidably engaged with said posts, a stamp mounted on said carrier rod and having a guide slidably engaging said guide rod, a crank shaft mounted in the aforesaid bearings, and depressing means for the aforesaid carrier rod connected with and actuated by said crank shaft.

3. In a machine of the class described, a register upon which a payee is required to register the amounts of collected bills, bill and stub receipting and severing means to which the payee conveys each paid bill and its attached stub, said receipting and severing means being mounted for simultaneous movement, and means whereby operation of said register will actuate said receipting and severing means simultaneously, thereby utilizing the required operation of said register to simultaneously convert the bill and stub into payer's and payee's records of payment.

In testimony whereof I have hereunto affixed my signature.

LUTHER B. HOWARD.